US012700785B2

(12) United States Patent (10) Patent No.: US 12,700,785 B2
Biggs et al. (45) Date of Patent: Aug. 4, 2026

(54) HAPTIC WRIST REST

(71) Applicant: Taction Technology, Inc., Los Gatos, CA (US)

(72) Inventors: Silmon James Biggs, San Diego, CA (US); John Douglas Steinberg, Millbrae, CA (US)

(73) Assignee: Taction Technology, Inc., Los Gatos, CA (US)

( * ) Notice: Subject to any disclaimer, the term of this patent is extended or adjusted under 35 U.S.C. 154(b) by 22 days.

(21) Appl. No.: 19/024,489

(22) Filed: Jan. 16, 2025

(65) Prior Publication Data

US 2025/0350178 A1      Nov. 13, 2025

Related U.S. Application Data

(63) Continuation of application No. 18/909,334, filed on Oct. 8, 2024, now abandoned, which is a continuation of application No. 18/763,287, filed on Jul. 3, 2024, now abandoned, which is a continuation of application No. 18/619,809, filed on Mar. 28, 2024, now abandoned, which is a continuation of application No. 18/538,607, filed on Dec. 13, 2023, now abandoned, which is a continuation of application No. 18/368,321, filed on Sep. 14, 2023, now abandoned, which is a continuation of application No. 18/201,964, filed on May 25, 2023, which is a continuation of application No. 18/098,875, filed on Jan. 19, 2023, now abandoned.

(60) Provisional application No. 63/361,770, filed on Jan. 20, 2022.

(51) Int. Cl.
        *H02K 35/02*        (2006.01)
        *G06F 3/01*          (2006.01)
(52) U.S. Cl.
        CPC ............. *H02K 35/02* (2013.01); *G06F 3/011* (2013.01); *G06F 3/016* (2013.01)
(58) Field of Classification Search
        CPC .......... H02K 35/02; G06F 3/011; G06F 3/016
        See application file for complete search history.

(56) References Cited

U.S. PATENT DOCUMENTS 8,624,839  B2 *   1/2014   Peterson ................. G06F 3/016
                                                                          345/161
   11,810,449  B2 *  11/2023   Low ......................... G08B 6/00
2004/0164971  A1 *   8/2004   Hayward ............ G06F 3/03547
                                                                          345/179
2020/0356173  A1 *  11/2020   Bajaj ...................... H02P 7/025

* cited by examiner

*Primary Examiner* — Steven Lim
*Assistant Examiner* — James E Munion
(74) *Attorney, Agent, or Firm* — Knobbe, Martens, Olson & Bear, LLP

(57) ABSTRACT

A haptic wrist rest is disclosed. The haptic wrist rest includes a tactile transducer, a wrist rest tray, and a plurality of torsion rollers that permit the wrist rest tray to move primarily along a single axis and provide a restoring force as the torsion rollers store energy by twisting in response to that motion. In some embodiments, the torsion rollers comprise a cylindrical inner portion and a hollow resilient outer portion. In some embodiments, the outer portion of the torsion roller is retained on protrusions within recesses in the bottom of the tray.

20 Claims, 10 Drawing Sheets

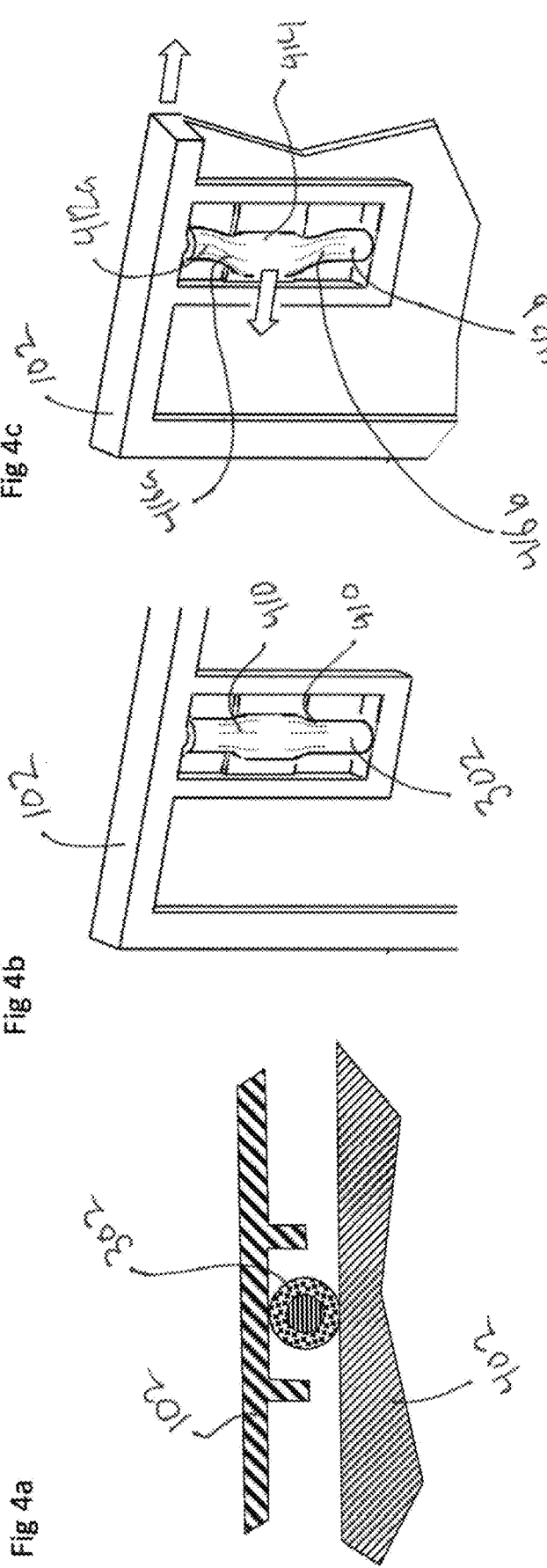

HAPTIC WRIST REST

RELATED APPLICATION

This application claims priority to provisional application No. 63/361,770, filed Jan. 20, 2022, which is incorporated herein in its entirety.

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

Haptic feedback has become an important aspect of many human-machine interfaces in recent years. Haptic transducers are found in devices like gaming controllers, smart phones, and even computer pointing devices such as mice.

Such devices are intended to convey information to a user through vibration. Whether that intention results in the user receiving that information, and whether that information is understood by the user and interpreted in a way that is useful, are two different things. Some devices use tactile transducers that are highly limited in the range of signals they can produce; some provide haptic information in a way that interferes with the primary function of the device (for example, a haptic mouse that reduces the accuracy with which the user can control the cursor or other aspect of use manipulated by the mouse). Limitations such as these have limited the market acceptance of such haptic devices in many applications.

One common form of haptic transducers used in haptic feedback devices in the linear resonant actuator (LRA). While LRAs are available at very low cost, and provide high electro-mechanical efficiency (that is, strong mechanical output at a given electrical input), they deliver this benefit at a real cost: that efficiency comes only within an extremely narrow frequency range.

Another limitation of some existing consumer haptic feedback devices is that they are incapable of conveying anything more specific than "something is happening;" that is, their vibration conveys little or no information about directionality or proportion.

The assignee of this application has previously patented and brought to market a haptic transducer that is capable of delivering a range of output forces output over a much wider frequency range than LRAs provide. This transducer has been applied in headphones. This application describes uses for that or other planar transducers in devices including but not limited to wrist rests for keyboards and mice/touchpads.

BRIEF DESCRIPTION OF THE DRAWINGS

FIG. 4a is a cross-sectional view of embodiments of a torsion roller, a wrist rest tray, and a working surface.

FIG. 4b shows an embodiment of a torsion roller mounted on an embodiment of a portion of a wrist rest tray.

FIG. 4c illustrates the effect of movement along the axis of motion of a torsion roller in an embodiment of the invention.

DETAILED DESCRIPTION OF THE PREFERRED EMBODIMENT

Figure 1:
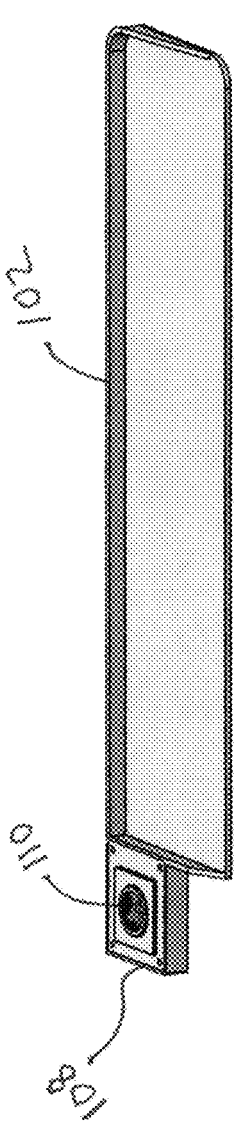
FIG. 1 is a simplified external perspective view of an embodiment of the subject invention.

FIG. 1 illustrates a simplified external view of an embodiment of the subject invention. Tray 102 rests (through a composite roller suspension as illustrated below) on a desktop or other working surface. Tray 102 preferably uses stiff, lightweight materials and design to minimize the mass that must be displaced by the tactile transducer that is housed in housing 108. Housing 108 may be located to either side of tray 102. Alternatively, in the case of a wrist rest intended for full key board or keyboard plus touchpad, housing 108 may be located between the areas intended for the left and right hands. Housing 108 preferably includes a porthole 110 (preferably covered by a clear material such as transparent thermoplastic) through which the movement of the tactile transducer inside housing 108 can be viewed. In operation, tray 102 will hold one or more wrist pads (not shown in this view). The wrist pad(s) are preferably comprised of a compliant material and are also preferably low in mass. Preferably the compliance of the cushion material is tuned so that the cushion is both comfortable and capable of transmitting the forces generated by the tactile transducer. One approach to balancing the need for compliance and the efficient transmission of tactile signals is to use anisotropic materials for at least a portion of thickness of the cushion-that is, materials that are relatively stiff against transverse forces (such as those generated by the tactile transducer in order to urge the wrist rest laterally), but relatively compliant in compression vertically.

Figure 2:
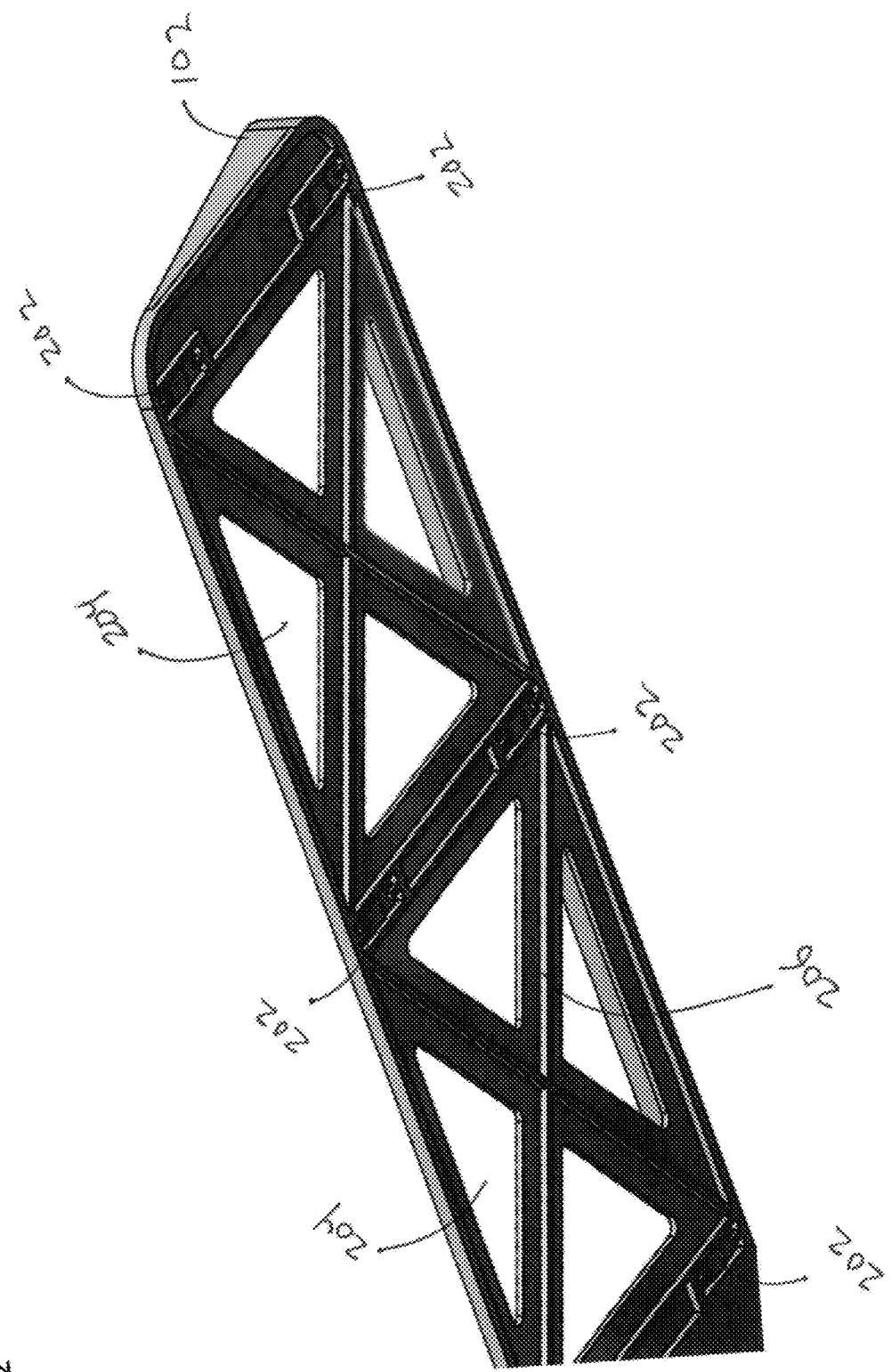
FIG. 2 is a perspective view of a portion of the bottom of an embodiment of the tray portion of an embodiment of the subject invention, illustrating certain features that normally face a desktop or other working surface.

FIG. 2 illustrates certain features of the side of an embodiment of the subject invention that normally faces a desktop or other working surface. Incorporated into tray 102 are recesses 202, which house the portions of the suspension for the tray described herein as torsion rollers, and as are described in detail in FIGS. 3a, 3b, 3c and 3d. The illustrated embodiment includes six such recesses. The appropriate number will vary depending upon the size of tray 102, its stiffness, and other factors.

The efficiency of the tactile transducer may be increased by reducing the mass of the moving portions of the device including wrist tray 102. Thus tray 102 may be include features to reduce mass without reducing stiffness, such as openings 204 and stiffening ribs 206.

Figures 3A, 3B, 3C, 3D:
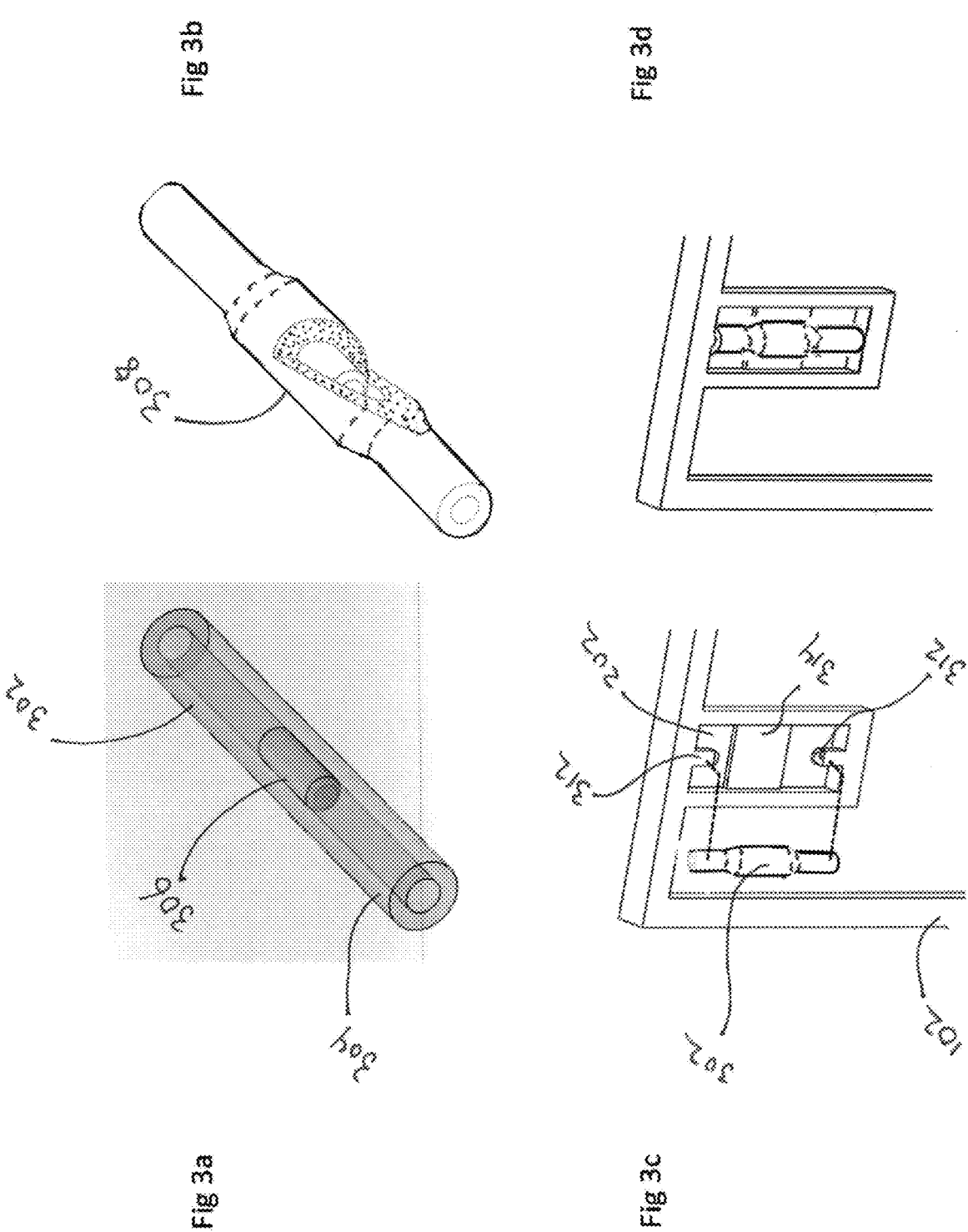
FIG. 3a is a semi-transparent view of embodiments of components of a torsion roller illustrating an aspect of the relationship between those components.
FIG. 3b is a cut-away view of embodiments of components of a torsion roller illustrating another aspect of the relationship between those components.
FIG. 3c shows assembled components of embodiments of a torsion roller together with a portion of the underside of an embodiment of a tray portion of the subject invention, illustrating components of the portions of the tray that mate with the torsion roller.
FIG. 3d shows an assembled embodiment of a torsion roller mounted to an embodiment of a wrist rest tray.

FIG. 3a illustrates an embodiment of a torsion roller 302. It comprises a round tube 304 and dowel 306. Tube 304 is preferably comprised of a relatively resilient material, such as EPDM (ethylene propylene diene monomer). However, other materials including but not limited to acro-nitrile butadiene rubber, ethylene propylene diene rubber, fluoro-carbon rubber, natural rubber, silicone rubber, or other similar materials may be used. Materials that minimize creep (long-term deformation resulting from persistent loading) are presently preferred. Using relatively compliant materials for tube 304 reduces noise when tray 102 is moving. Dowel 306 is a round cylinder mounted inside tube 304. Dowel 306 is preferably comprised of a more rigid material than tube 302. Presently preferred materials include steel, aluminum or brass. However, relatively rigid plastics may also be used. Dowel 306 may be pressed into tube 304. Alternatively, dowel 306 may be co-molded inside tube 304, which may reduce manufacturing costs. As illustrated in FIG. 3b, in the currently preferred embodiment, dowel 306 is sized so that its outer diameter is larger than the inner diameter of tube 304 (when tube 306 is in its relaxed state). This serves two purposes: first, it serves to aid retention of the dowel in its proper location axially in tube 304. Second, it increases the outside diameter 308 of the center section of tube 304 where it contacts both the underside of tray 102 and the underlying working surface such as a desktop. This helps to reduce contact of the other portions of tube 304 with those surfaces. In an alternative embodiment, tube 304 may consist of a single material (such as a polymer) with a solid center section and hollow tubular ends, thereby obviating the need for a separate dowel and the related assembly steps.

FIG. 3c illustrates a torsion roller 302 as shown in FIG. 3a, but in relation to a recess 202 in tray 102. Tray 102 includes a plurality of recesses 202. Each recess includes a plurality of tabs 312. Each tab 312 preferably comprises a shape that is not round, such as square or rectangular in cross-section, and are sized so that tube 304 stretches when tab 312 is inserted into the end of tube 304. The mismatch between the shape of tab 312 and the natural shape of tube 304 helps to prevent the portions of tube 304 that contact tabs 312 from rotating on tabs 312.

Recess 202 may also include a raised boss 314. Boss 314 is preferably shaped so that its length roughly corresponds to the portion of tube that has a larger outside diameter because of the presence of dowel 306. Tray 102, recess 202, boss 314 and torsion roller 302 are preferably sized so that both at rest and when expected forces (such as the weight of a user's wrist) are placed upon it, tray 102 does not directly contact the desktop or other surface on which the device is placed; rather, those forces are transmitted through torsion roller 302.

FIG. 3d illustrates a torsion roller 302 as installed in a recess 202.

FIGS. 4a, 4b and 4c illustrate the operation of an embodiment of a torsion roller as disclosed herein. FIG. 4a is a cross-sectional view that illustrates a torsion roller 302 mounted in a carrier such as tray 102 previously described, and resting on a work surface such as a desktop 402. Torsion roller 302 is held in position in tray 102 by tabs 312 as illustrated in FIGS. 3c and 3d. The weight of tray 102 and anything resting on tray 102 creates downward force that is borne by tray 102, which in turn transmits the force to torsion roller 302. Torsion roller 302 in turn rests on desktop or other working surface 402.

FIG. 4b is a perspective view of tray 102 and a torsion roller 302 when torsion roller 302 is in its neutral position—that is when no lateral forces are displacing torsion roller 302. In FIG. 4b, torsion roller 302 is marked with longitudinal stripes 410 to help illustrate the nature of its movement when tray 102 is displaced, such as by a tactile transducer housed in housing 108.

FIG. 4c is a perspective view of tray 102 and a torsion roller 302 when tray 102 has been displaced laterally by a tactile transducer housed in housing 108. The displacement of tray 102 causes fixed ends 412a and 412b of torsion roller 402 to move laterally with tray 102. Because central portion 414 of torsion roller 402 bears the weight of tray 102 (and whatever rests upon it), and because it is generally round (but for deformation caused by the weight), as torsion roller is carried transversely relative to its cylindrical cross-section, it will tend to rotate in the manner of a roller bearing. Because central portion 414 is rotating, but fixed ends 412a and 412b are prevented from rolling by tabs 404a and 404b, the intermediate portions 416a and 416b of torsion roller that are between fixed ends 412a and 412b and the central portion 414 will twist. This twisting of intermediate portions 416a and 416b both permits the movement of tray 102 relative to work surface 402 with minimal noise, and provides elastic restoring force as intermediate portions 416a and 416b try to return to the neutral, unstressed position.

In some embodiments, the fixed ends 412a and 412b of torsion rollers 402 may be attached to tabs 312 by virtue of an interference fit—that is, if the tabs stretch the inner diameter of the tube sufficiently to hold them in place. Alternately, tabs 312 may be barbed to further enhance the strength of the hold, or tabs 312 may include features such as j-shaped hooks that can be fitted into holes in the torsion rollers. In another embodiment, the fixed ends 412a and 412b of torsion rollers 402 may be attached to tabs 312 by welding or melting the two components together, such as by ultrasonic welding. In another embodiment, protrusions may capture the two ends of the tube by pinching them in slots. In this embodiment the ends of the pinched tube may each comprise a bulbous portion, such as a knot or molded ball, such that the tube ends cannot be pulled through the retaining slots longitudinally.

Figures 5A, 5B, 5C:
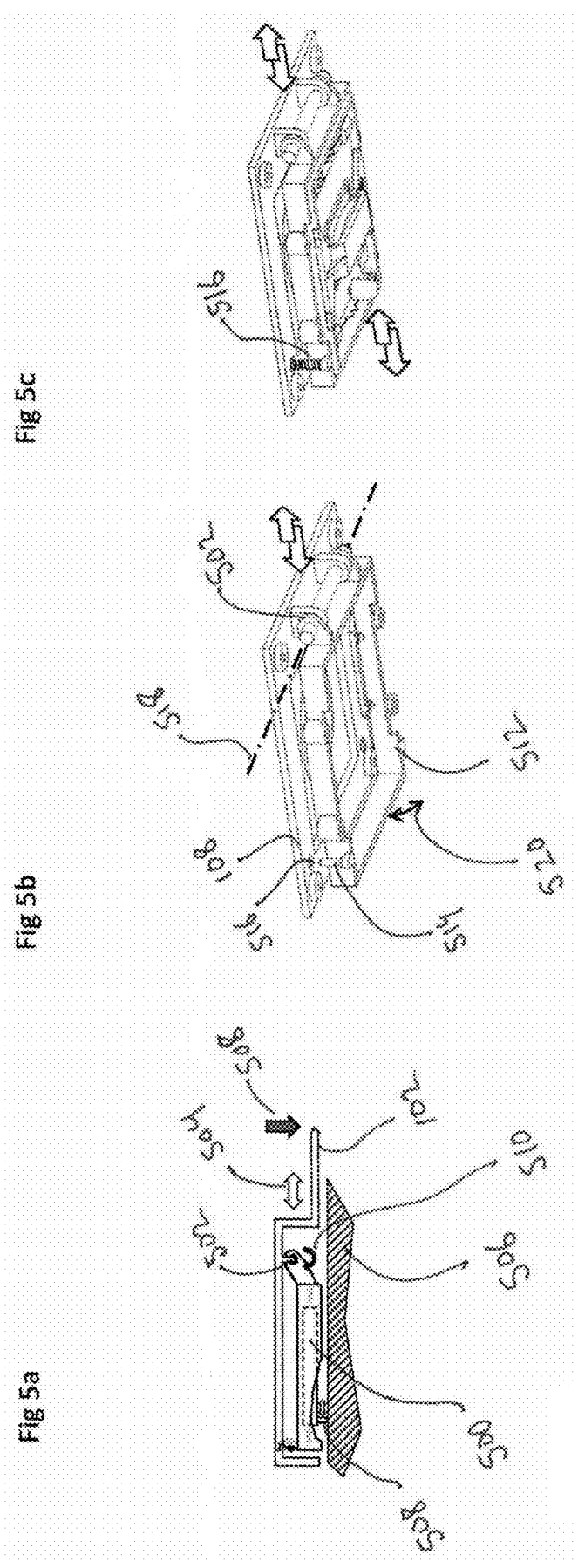
FIG. 5a illustrates an embodiment of a tactile transducer mounted on an embodiment of a wrist rest tray.
FIG. 5b shows another view of an embodiment of a tactile transducer mounted on an embodiment of a wrist rest tray.
FIG. 5c shows another view of an embodiment of a tactile transducer mounted on an embodiment of a wrist rest tray.

A potential issue that must be addressed in the operation of such a device is the effect of force being exerted by a user onto a cushion and then tray 102 relative to the alignment of the moving portions of the tactile transducer housed in housing 108. That tactile transducer must be relatively rigidly coupled to tray 102 in order for the tactile transducer to transmit the intended lateral displacement forces to tray 102. On the other hand, tray 102 may present a large surface and/or a long lever arm with which to transmit out-of-plane forces to the tactile transducer. For maximum efficiency, electromechanical tactile transducers tend to have small clearances between their moving and fixed components. Those forces could cause the moving portion to make contact with the fixed portion, and potentially bind or even damage the tactile transducer. It may also be advantageous to securely couple the "fixed" portion of the tactile transducer As illustrated in FIGS. 5a, 5b and 5c, in the currently preferred embodiment, tactile transducer 500 is connected to tray 102 via a coupling that preferably provides one degree of freedom, such as a hinge 502. FIG. 5a illustrates how, when tactile transducer 500 generates lateral forces, those forces are transferred through hinge 502 into movement 504 of tray 102. The stationary components of tactile transducer 500 may be anchored to working surface 506 with a foot 508. If a vertical load 508 is placed on tray 102, those loads will be transmitted to tactile transducer 500 through hinge 502, which will tend to cause tactile transducer 500 to rotate 510 relative to tray 102 around the centerline of hinge 502, rather than causing binding and/or noise between the fixed and moving portions of tactile transducer 500. The rotation of tactile transducer 500 will tend to lift tactile transducer 500 away from contact with working surface 506. This movement can be countered by use of a spring or other resilient element located between housing 108 and the moving portion 510 of tactile transducer 500, as illustrated in a subsequent figure.

FIG. 5b is a perspective view of components 512 of the moving portion of tactile transducer 500, hinge 502 and housing 108. Also visible are bosses 514 on moving portion 512 and 516 on housing 108, which may be used to hold captive a compression spring used to counteract the rotational forces described above. Axis 518 through the center of hinge 502 constrains the rotational motion 520 of tactile transducer 500 relative to housing 108.

FIG. 5c is the same perspective view as in FIG. 5b, but it illustrates a compression spring 516 located on bosses 512 and 514. In some embodiments multiple springs may be used. Also illustrated are additional components of tactile transducer 500, as will be described below.

Figure 6:
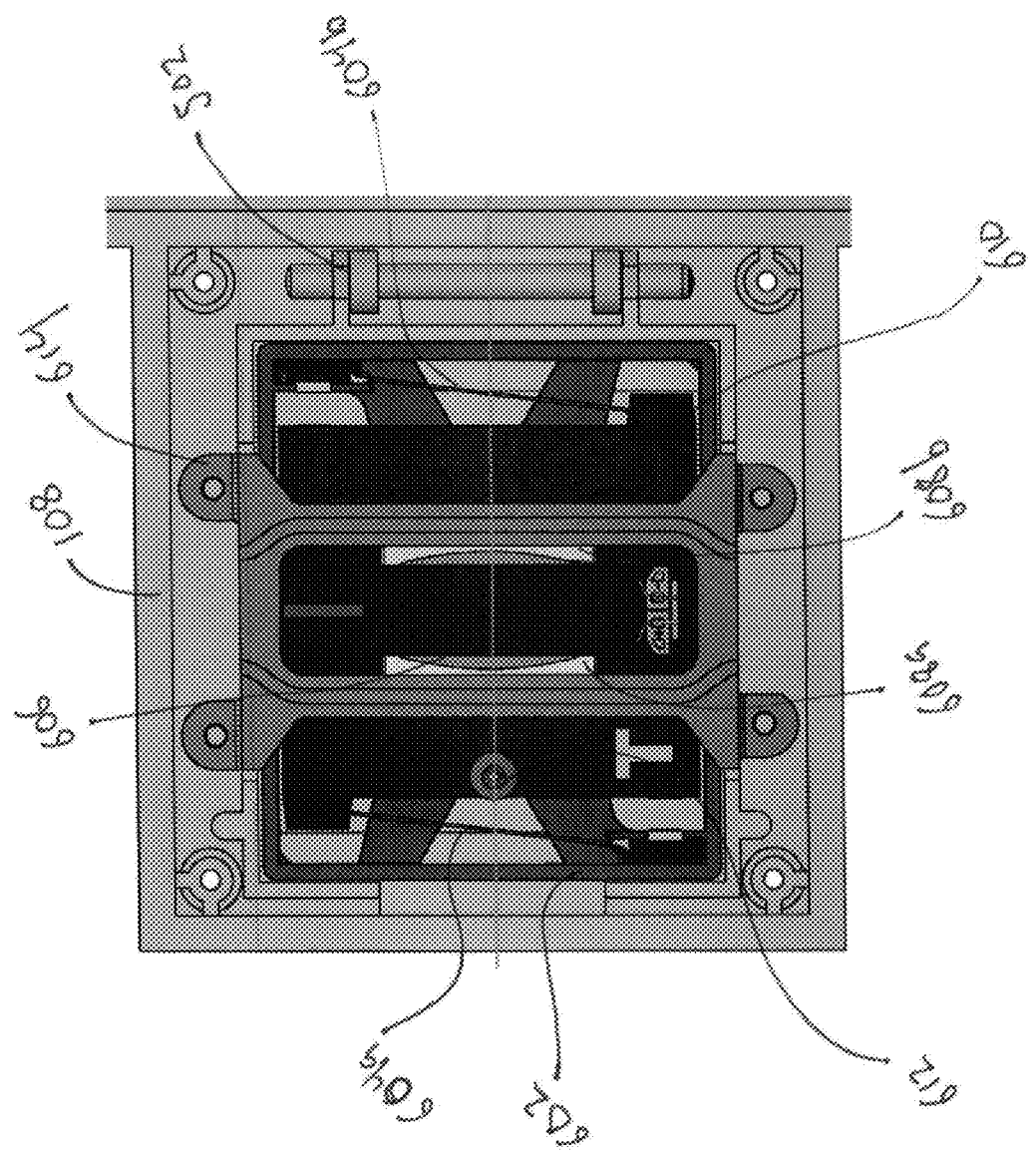
FIG. 6 shows another view of an embodiment of a tactile transducer mounted on an embodiment of a wrist rest tray.

FIG. 6 is a plan view of the components of an exemplary tactile transducer 500 that may be used as part of the subject invention attached to a portion of housing 108. It includes frame 602, flexures 604a and 604b, coil 606, magnets 608a and 608b (behind coil 606), and static portion 610. Attached to static portion 610 is foot 612, which contacts the desktop or other work surface on which the invention is used. When an electrical signal is applied to coil 606, Lorentz forces cause the moving portion (in this application, the frame 602 and all components connected to it, including housing 108) to move in a lateral planar motion relative to the fixed portion. Also shown in FIG. 6 are retention bracket 614, which attaches tactile transducer 500 to housing 108, and hinge 502.

Figure 7B:
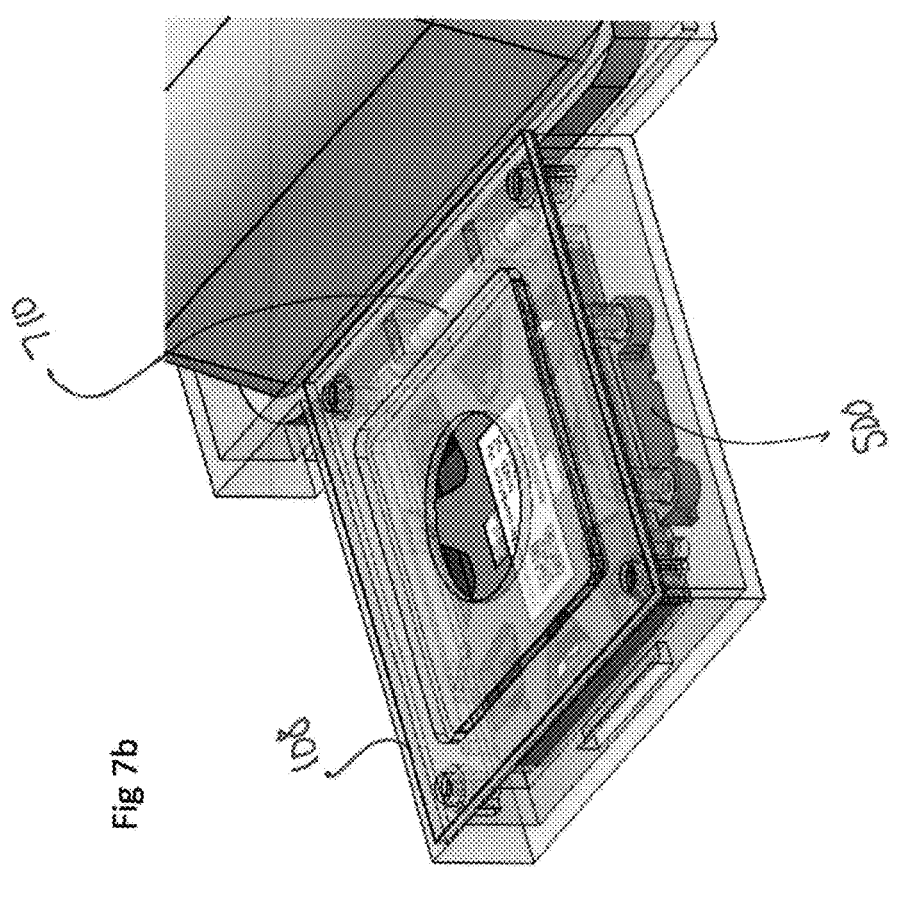
FIG. 7b shows the assembled components of one embodiment of a tactile transducer as attached to an embodiment of a wrist rest tray.
Figure 7A:
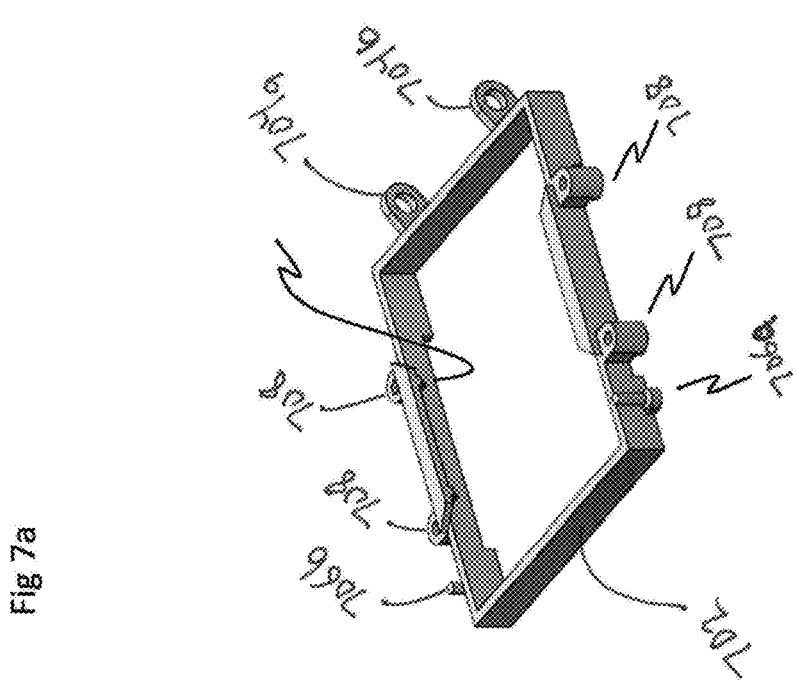
FIG. 7a shows an embodiment of a frame or bracket used to attach a tactile transducer to a wrist rest tray.

FIG. 7a illustrates the frame 702 of an exemplary tactile transducer 500. It includes bosses 704a and 704b through which a hinge pin is inserted, spring retaining pins 706a and 706b, and screw bosses 708, which are used to fasten the clamp that retains the tactile transducer 500 into the frame 702. Frame 702 may also comprise one or more features 710 to help anchor the moving portion of tactile transducer 500 to frame 702.

FIG. 7b illustrates a perspective view of an exemplary embodiment showing the relationships between tactile transducer 500, housing 108, and hinge pin 710.

Figure 8:
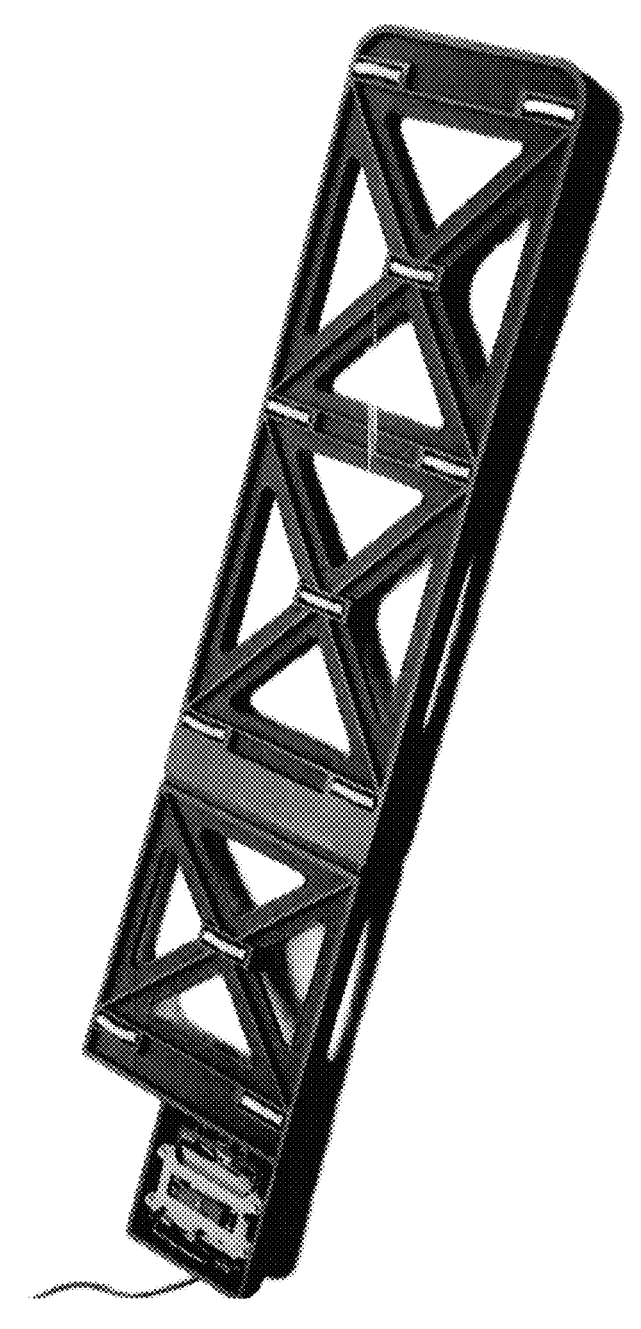
FIG. 8 shows the underside of a fully assembled embodiment of the invention.

FIG. 8 is a prototype of an exemplary embodiment that includes eleven torsion rollers.

Figure 9:
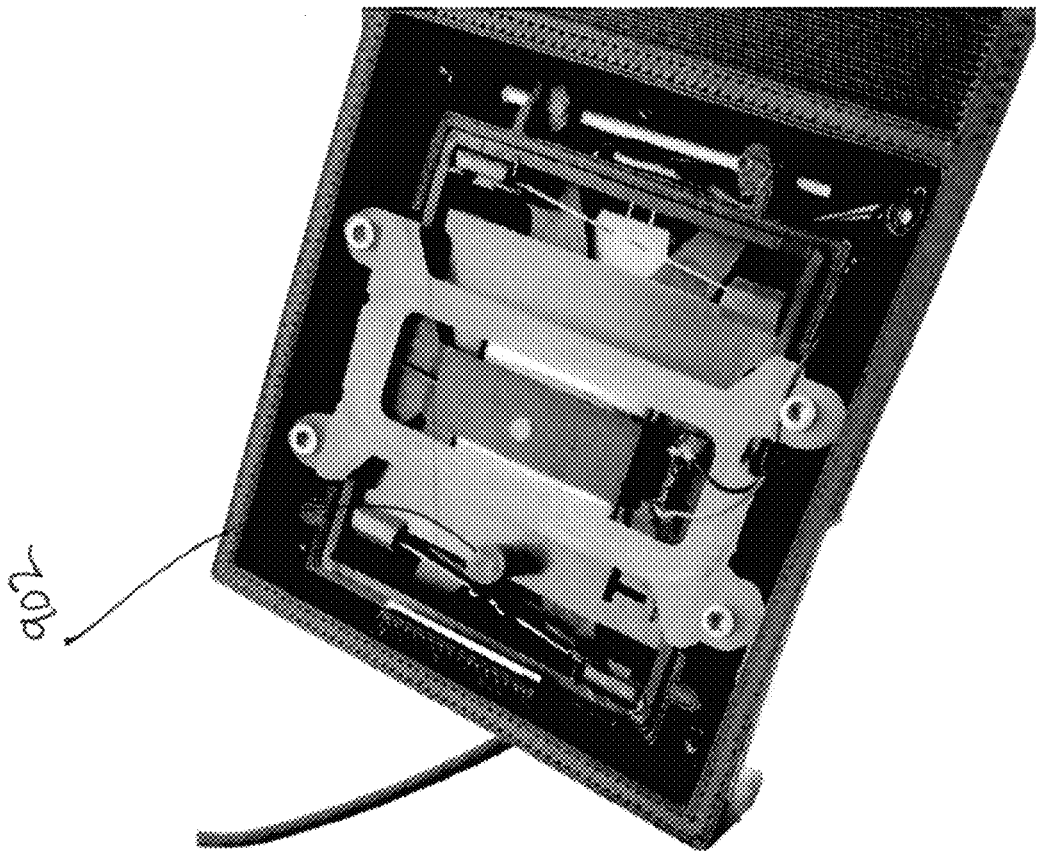
FIG. 9 shows a detailed view of an embodiment of a tactile transducer mounted in a housing within a part of an embodiment of a haptic wrist rest.

FIG. 9 is a prototype of an exemplary embodiment including a foot 902 to anchor the fixed portion of the tactile transducer 500. Foot 902 may be comprised of a rigid inner portion, such as a threaded fastener or molded plastic feature, and a more compliant outer or lower portion, which may be comprised of sorbothane or another elastomer.

Figure 10:
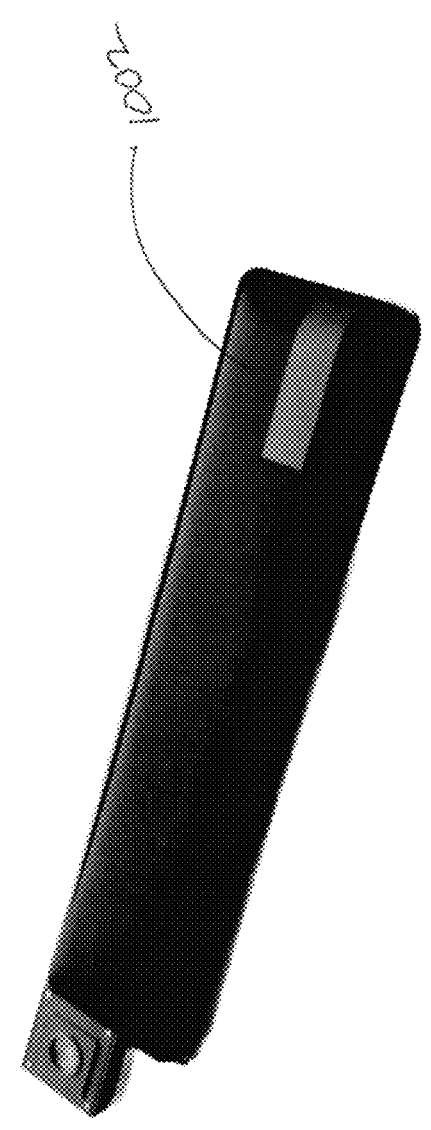
FIG. 10 shows another view of a fully assembled embodiment of the invention.

FIG. 10 is a prototype of an exemplary embodiment illustrating a complete assembly including wrist rest cushion 1002.

In an alternate embodiment, elastically deformable feet may be used instead of or in combination with torsion rollers to suspend tray 102. Such deformable feet may be made of an elastomer such as sorbothane. However, in the currently preferred embodiments, at least some of the feet should be torsion rollers in order to minimize the extent to which tray 102 is permitted to move in directions other than laterally. Simple elastomer feet tend to deform equally in multiple planes.

In an alternate embodiment the foot that couples the transducer to the external flat surface may be omitted entirely. In this embodiment, the transducer imparts motion to the tray solely by the action of inertial forces. That is, as the moving mass of the transducer accelerates in one direction, the tray is accelerated in the opposite direction, in accordance with Newton's third law of motion.

Other applications for the systems and methods described herein may include seating for gaming or watching movies. Such systems, if sufficiently scaled up in size and power, could move seat cushions or even entire chairs or couches.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and other embodiments are intended to be included within the scope of the appended claims.

What is claimed is:

1. An apparatus that transmits vibrations to at least a portion of a hand of a user of a computer keyboard, said apparatus comprising:

a tray comprising an upper surface and a lower surface, wherein said lower surface includes a plurality of protrusions;

a planar transducer, comprising a first subassembly that comprises at least a magnet, a second subassembly that comprises at least a coil, and a plurality of flexures that permit planar motion of said first subassembly relative to said second subassembly;

wherein one of said first subassembly and said second subassembly of said transducer is coupled to said tray, and said other of said first subassembly and said second subassembly of said transducer is coupled to an external generally flat surface;

wherein an electric signal transmitted to said at least a coil produces relative motion between said at least a magnet and at least a coil, and thereby produces relative motion between said tray and said external generally flat surface a plurality of torsion rollers; the torsion rollers comprising:

an inner portion comprising dowel or cylinder with an outer diameter comprising a first diameter and a first length;

an outer portion comprising a hollow cylinder formed from a compliant material with at least an inner diameter comprising a second diameter and a second length, wherein said second diameter is at least slightly smaller than said first diameter of the outer portion, and said second length is greater than said first length, so that when said inner portion is placed inside said outer portion, the inner portion is retained within the outer portion by the radial tension caused by the difference between the first diameter and the second diameter; and wherein when the inner portion is placed inside the outer portion such that the inner portion is roughly centered within the outer portion, the outer diameter of the hollow cylinder is greater where the inner cylinder is located and lesser where the inner portion is not located within said outer portion;

wherein each of a first end and a second end of each of said plurality of torsion rollers is retained by a protrusion or tab on the underside of said tray;

wherein the plurality of torsion rollers are all oriented so that their respective axes of rotation are at least roughly parallel;

wherein a first force displacing the tray in a direction orthogonal to the axis of rotation of the plurality of torsion rollers while maintaining contact between the rollers and the surface upon which the tray is placed cause central portions of the torsion rollers to both rotate and twist around their axis of rotation relative to the portions of the torsion rollers retained by the protrusions in the underside of the tray;

wherein the rotation of the torsion rollers stores elastic energy in the torsion rollers, so that when wherein the first force is no longer applied, the torsion rollers release elastic energy and apply a second force tending to displace the tray in the opposite direction relative to the displacement generated by the first force; and wherein, when the apparatus is placed on a substantially flat surface with the torsion rollers contacting the substantially flat surface and supporting the tray, the tray is constrained against motion in a direction along an axis parallel to the axes of rotation of the plurality of torsion rollers relative to motion transverse to the axes of rotation of the plurality of torsion rollers.

2. The apparatus of claim 1 wherein movement of said first subassembly and said second subassembly of said transducer causes said tray to reciprocate in a plane parallel to the relative to the external generally flat surface.

3. The apparatus of claim 1 wherein the plurality of torsion rollers includes at least 5 torsion rollers.

4. The apparatus of claim 1 wherein the outer portion of a plurality of said torsion rollers comprises at least one of ethylene propylene diene monomer, acro-nitrile butadiene rubber, ethylene propylene diene rubber, fluorocarbon rubber, silicone rubber, or natural rubber.

5. The apparatus of claim 1 wherein said protrusions or tabs on said comprise at least a hook.

6. The apparatus of claim 1 wherein said tray comprises a resilient pad on its top surface.

7. The apparatus of claim 1 wherein said tray is suspended by a plurality of torsion rollers and at least a foot made of a deformable material.

8. The apparatus of claim 1 wherein a portion of said tactile transducer is connected to the surface under the tray by a foot or pad.

9. The apparatus of claim 1 wherein a portion of said tactile transducer is connected to said tray by a hinge.

10. The apparatus of claim 1 wherein said torsion rollers are attached to said protrusions or tabs by an adhesive or a form of melting or welding.

11. An apparatus for transmitting vibrations to at least a portion of a hand of a user of a device for interacting with a microprocessor-controlled device, said apparatus comprising:

a tray comprising an upper surface and a lower surface;

a planar transducer, comprising a first subassembly that comprises at least a magnet, a second subassembly that comprises at least a coil, and a plurality of flexures that permit planar motion of said first subassembly relative to said second subassembly;

wherein one of said first subassembly and said second subassembly of said transducer is coupled to said tray, and said other of said first subassembly and said second subassembly of said transducer is operated while resting on an external surface;

wherein an electric signal transmitted to said at least a coil produces relative motion between said at least a magnet and at least a coil, and thereby produces relative motion between said tray and said external generally flat surface;

wherein one of said first subassembly and said second subassembly of said transducer is coupled to an external surface below said tray through a foot comprising both a relatively rigid portion and a relatively compliant portion;

wherein the other of said first subassembly and said second subassembly of said transducer is coupled to said tray by at least a hinge at one end of said subassembly and at least a resilient member at the other of said subassembly, wherein said vertical loads are transmitted from said tray to said subassembly primarily through said at least a resilient member, while transverse loads transmitted from said tray to said subassembly are constrained at least in part by said hinge;

a plurality of torsion rollers; the torsion rollers comprising:

an inner portion comprising dowel or cylinder with an outer diameter comprising a first diameter and a first length;

an outer portion comprising a hollow cylinder formed from a compliant material with at least an inner diameter comprising a second diameter and a second length, wherein said second diameter is at least slightly smaller than said first diameter of the outer portion, and said second length is greater than said first length, so that when said inner portion is placed inside said outer portion, the inner portion is retained within the outer portion by the radial tension caused by the difference between the first diameter and the second diameter; and wherein when the inner portion is placed inside the outer portion such that the inner portion is roughly centered within the outer portion, the outer diameter of the hollow cylinder is greater where the inner cylinder is located and lesser where the inner portion is not located within said outer portion;

wherein each of a first end and a second end of each of said plurality of torsion rollers is retained by a protrusion or tab on the underside of said tray;

wherein the plurality of torsion rollers are all oriented so that their respective axes of rotation are at least roughly parallel;

wherein a first force displacing the tray in a direction orthogonal to the axis of rotation of the plurality of torsion rollers while maintaining contact between the rollers and the surface upon which the tray is placed cause central portions of the torsion rollers to both rotate and twist around their axis of rotation relative to the portions of the torsion rollers retained by the protrusions in the underside of the tray;

wherein the rotation of the torsion rollers stores elastic energy in the torsion rollers, so that when wherein the first force is no longer applied, the torsion rollers release elastic energy and apply a second force tending to displace the tray in the opposite direction relative to the displacement generated by the first force; and wherein, when the apparatus is placed on a substantially flat surface with the torsion rollers contacting the substantially flat surface and supporting the tray, the tray is constrained against motion in a direction along an axis parallel to the axes of rotation of the plurality of torsion rollers relative to motion transverse to the axes of rotation of the plurality of torsion rollers.

12. The apparatus of claim 11 wherein movement of said first subassembly and said second subassembly of said transducer causes said tray to reciprocate in a plane parallel to the relative to the external generally flat surface.

13. The apparatus of claim 11 wherein the plurality of torsion rollers includes at least 5 torsion rollers.

14. The apparatus of claim 11 wherein the outer portion of a plurality of said torsion rollers comprises at least one of ethylene propylene diene monomer, acro-nitrile butadiene rubber, ethylene propylene diene rubber, fluorocarbon rubber, silicone rubber, or natural rubber.

15. The apparatus of claim 11 wherein said protrusions or tabs on said comprise at least a hook.

16. The apparatus of claim 11 wherein said tray comprises a resilient pad on its top surface.

17. The apparatus of claim 11 wherein said tray is suspended by a plurality of torsion rollers and at least a foot made of a deformable material.

18. The apparatus of claim 11 wherein a portion of said tactile transducer is connected to the surface under the tray by a foot or pad.

19. The apparatus of claim 11 wherein a portion of said tactile transducer is connected to said tray by a hinge.

20. The apparatus of claim 11 wherein said torsion rollers are attached to said protrusions or tabs by an adhesive or a form of melting or welding.

* * * * *